(12) United States Patent
Jo et al.

(10) Patent No.: US 12,090,908 B2
(45) Date of Patent: Sep. 17, 2024

(54) MOBILE OBJECT

(71) Applicants: Hyundai Motor Company, Seoul (KR); Kia Corporation, Seoul (KR); MOBINN Inc., Suwon-si (KR)

(72) Inventors: Sun Myoung Jo, Ansan-si (KR); Jin Choi, Seoul (KR); Hoon Chung, Hwaseong-si (KR)

(73) Assignees: Hyundai Motor Company, Seoul (KR); Kia Corporation, Seoul (KR); Mobinn Inc., Suwon-si (KR)

(*) Notice: Subject to any disclaimer, the term of this patent is extended or adjusted under 35 U.S.C. 154(b) by 360 days.

(21) Appl. No.: 17/586,072

(22) Filed: Jan. 27, 2022

(65) Prior Publication Data

US 2022/0410784 A1    Dec. 29, 2022

(30) Foreign Application Priority Data

Jun. 29, 2021   (KR) .................. 10-2021-0084945

(51) Int. Cl.
*B60P 1/44* (2006.01)
*B60P 3/00* (2006.01)

(52) U.S. Cl.
CPC ............. *B60P 1/4421* (2013.01); *B60P 3/007* (2013.01)

(58) Field of Classification Search
CPC .................... B60P 1/4421; B60P 3/007
See application file for complete search history.

(56) References Cited

U.S. PATENT DOCUMENTS

| | | | |
|---|---|---|---|
| 9,944,462 B2 | 4/2018 | Fava | |
| 11,104,516 B2 | 8/2021 | Li et al. | |
| 11,465,544 B2 * | 10/2022 | Hara | B62D 25/2054 |
| 2019/0329978 A1 | 10/2019 | Li et al. | |
| 2022/0105854 A1 * | 4/2022 | Matsushita | G05D 1/0297 |
| 2022/0105855 A1 * | 4/2022 | Iwamoto | A47G 29/20 |
| 2022/0219900 A1 * | 7/2022 | Eidsmore | B60P 1/4421 |
| 2022/0250528 A1 * | 8/2022 | Iwamoto | B60P 9/00 |
| 2022/0390949 A1 * | 12/2022 | Shimada | G06V 20/52 |
| 2023/0039357 A1 * | 2/2023 | Jo | G06T 7/62 |
| 2023/0347809 A1 * | 11/2023 | Kiyokami | B60P 3/007 |

FOREIGN PATENT DOCUMENTS

| | | | | |
|---|---|---|---|---|
| JP | 2003070573 A | 3/2003 | | |
| JP | 2020508224 A | 3/2020 | | |
| JP | 2020508274 A | 3/2020 | | |
| JP | 2020-169995 | * 10/2020 | ......... | G05D 1/0297 |
| KR | 101466118 B1 | 11/2014 | | |
| KR | 101924493 B1 | 12/2018 | | |
| KR | 20200055932 A | 5/2020 | | |

* cited by examiner

*Primary Examiner* — Saul Rodriguez
*Assistant Examiner* — Ashley K Romano
(74) *Attorney, Agent, or Firm* — Slater Matsil, LLP

(57) ABSTRACT

An embodiment mobile object includes a frame part having an internal space, a wheel part coupled to a first side of the frame part and comprising a wheel, movable modules coupled to a second side of the frame part and configured to be movable in a vertical direction relative to the frame part, and a door module coupled to a first side of the movable modules, the door part being rotatable relative to the movable modules in a direction toward the internal space or a direction away from the internal space.

20 Claims, 10 Drawing Sheets

MOBILE OBJECT

CROSS-REFERENCE TO RELATED APPLICATIONS

This application claims the benefit of Korean Patent Application No. 10-2021-0084945, filed on Jun. 29, 2021, which application is hereby incorporated herein by reference.

TECHNICAL FIELD

The present disclosure relates to a mobile object.

BACKGROUND

Recently, there is an increasing demand for mobility vehicles that may be used for various purposes in addition to the existing vehicles, and thus studies are being actively conducted on unmanned delivery robots.

Because the unmanned delivery robot in the related art has been designed focusing on the delivery of articles, means for specifying how to deliver the article to a user at a destination have not been sufficiently considered. For example, in the case of the unmanned delivery robot in the related art, the user at the destination directly takes the article out of the unmanned delivery robot when the user is present at the destination.

In contrast, when the user is not present at the destination, the unmanned delivery robot drops the article on the floor. However, if this method is applied to an article with low durability, the article may be damaged.

SUMMARY

The present disclosure relates to a mobile object. Particular embodiments relate to a mobile object capable of delivering an article.

Embodiments of the present disclosure can provide a mobile object having a structure capable of safely delivering an article without the aid of a person at a destination.

An exemplary embodiment of the present disclosure provides a mobile object including a frame part having an internal space, a wheel part coupled to one side of the frame part and including one or more wheels, movable modules coupled to the other side of the frame part and configured to be movable relative to the frame part, and a door module coupled to one side of the movable modules and configured to be rotatable in a direction toward the internal space or a direction away from the internal space, in which the movable modules are movable in a vertical direction, and in which the door module is rotatable relative to the movable modules and rotatable about the own axis of the door module.

The movable module may include a first coupling member fixedly coupled to the frame part a rail part slidably coupled to the first coupling member, a second coupling member slidably coupled to the rail part, and a movable belt member configured to surround the rail part and having one side coupled to the first coupling member and the other side coupled to the second coupling member.

One side and the other side of the movable belt member may be respectively and fixedly coupled to the first coupling member and the second coupling member.

The rail part may include a first rail member slidably coupled to the first coupling member and a second rail member slidably coupled to the second coupling member.

The first rail member may be disposed at a front side of the frame part, and the second rail member may be disposed at a front side of the first rail member.

The movable module may further include a first pulley disposed between the first rail member and the second rail member in a direction in which the movable belt member extends and a first power supply member configured to provide power for rotating the first pulley.

The first pulley and the first power supply member may be disposed in an upper region of the first rail member and the second rail member.

The first rail member and the second rail member may each extend in the vertical direction.

The movable modules may include a first movable module and a second movable module spaced apart from each other in a width direction, and the mobile object may further include a power transmission shaft having one side connected to the movable belt member provided in the first movable module, and the other side connected to the movable belt member provided in the second movable module.

The door module may include two door frames spaced apart from each other in a width direction, a first shaft disposed between the two door frames, and a door belt member configured to surround an outer portion of the first shaft and to be rotatable between the two door frames by a rotation of the first shaft.

The door module may further include a second shaft disposed between the two door frames, and the door frame may be coupled to the second shaft so as to be rotatable about the second shaft.

The first shaft and the second shaft may be disposed on the same axis.

The door module may further include a bearing member disposed between the first shaft and the second shaft and having one side being in contact with the first shaft and the other side being in contact with the second shaft.

The frame part may further include a conveying shaft rotatably provided and a conveying belt member configured to surround the conveying shaft and to be rotated by a rotation of the conveying shaft.

According to embodiments of the present disclosure, it is possible to provide the mobile object having the structure capable of safely delivering an article without the aid of a person at a destination.

DETAILED DESCRIPTION OF ILLUSTRATIVE EMBODIMENTS

Hereinafter, a mobile object according to embodiments of the present disclosure will be described with reference to the drawings.

Figure 1:
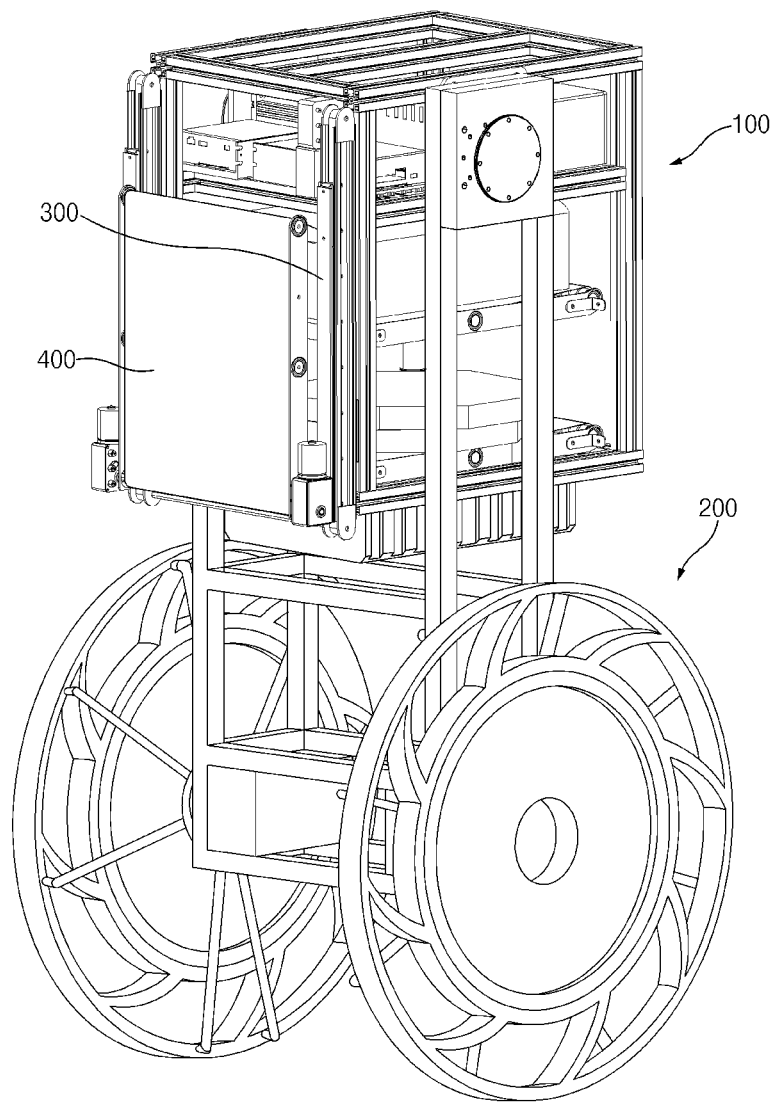
FIG. 1 is a perspective view illustrating a structure of a mobile object according to embodiments of the present disclosure.
Figure 2:
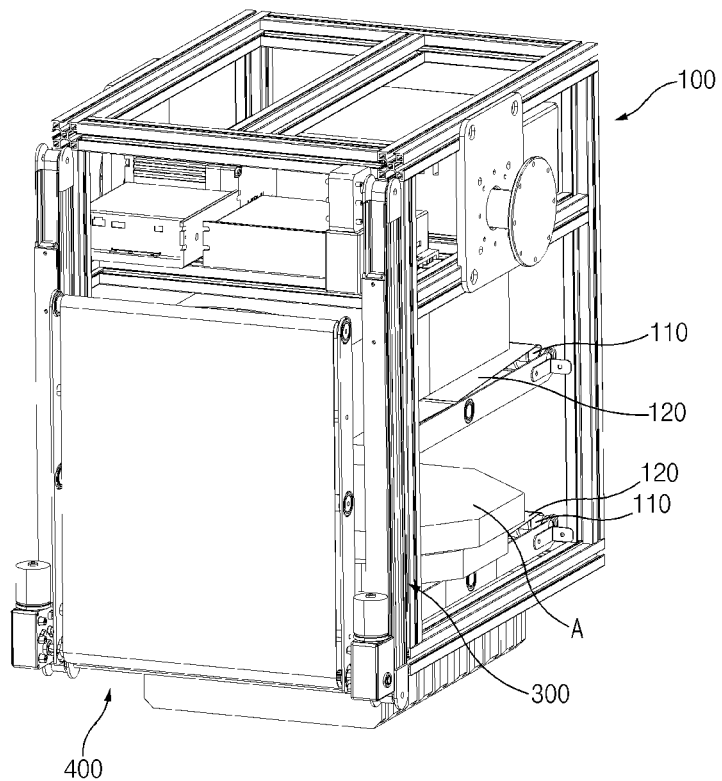
FIG. 2 is a perspective view illustrating a structure for coupling a frame part, movable modules, and a door module of the mobile object according to embodiments of the present disclosure.
Figure 3:
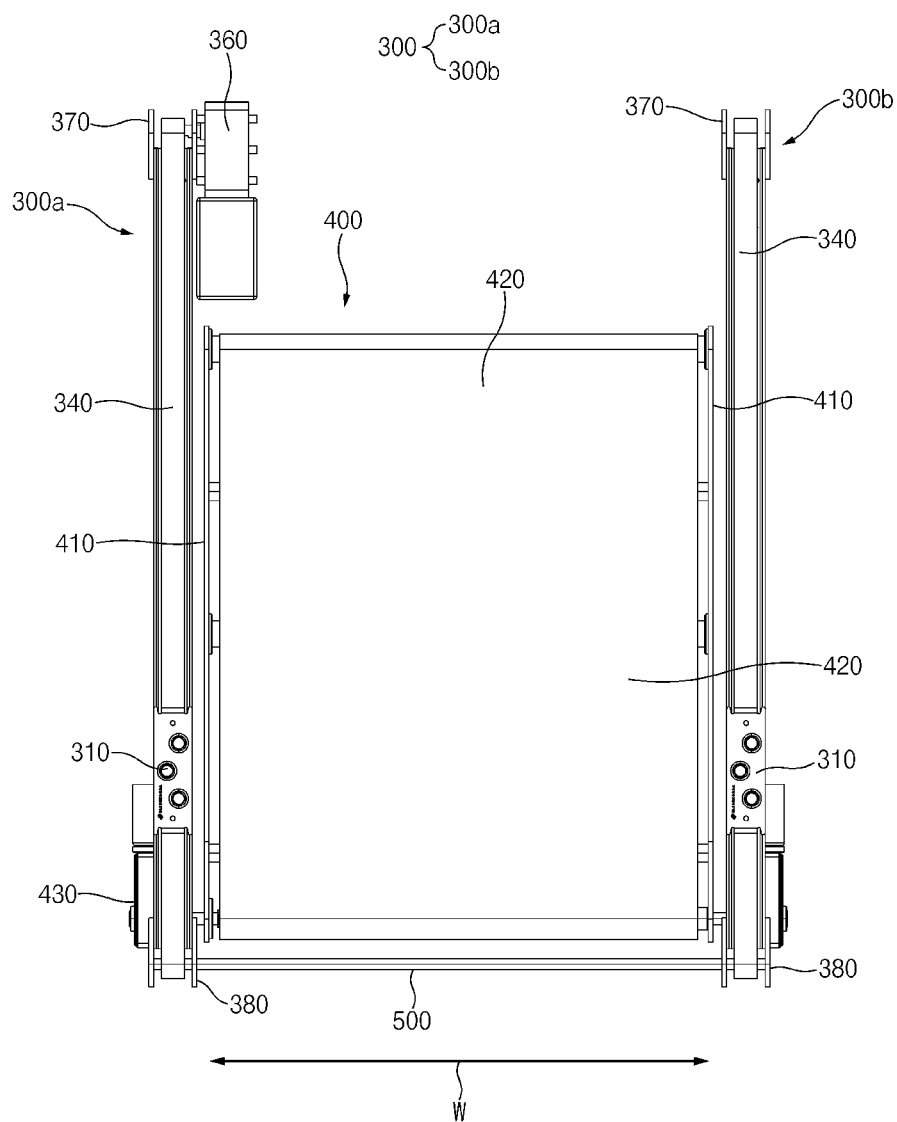
FIG. 3 is a rear view illustrating a structure for coupling the movable module and the door module of the mobile object according to embodiments of the present disclosure.
Figure 4:
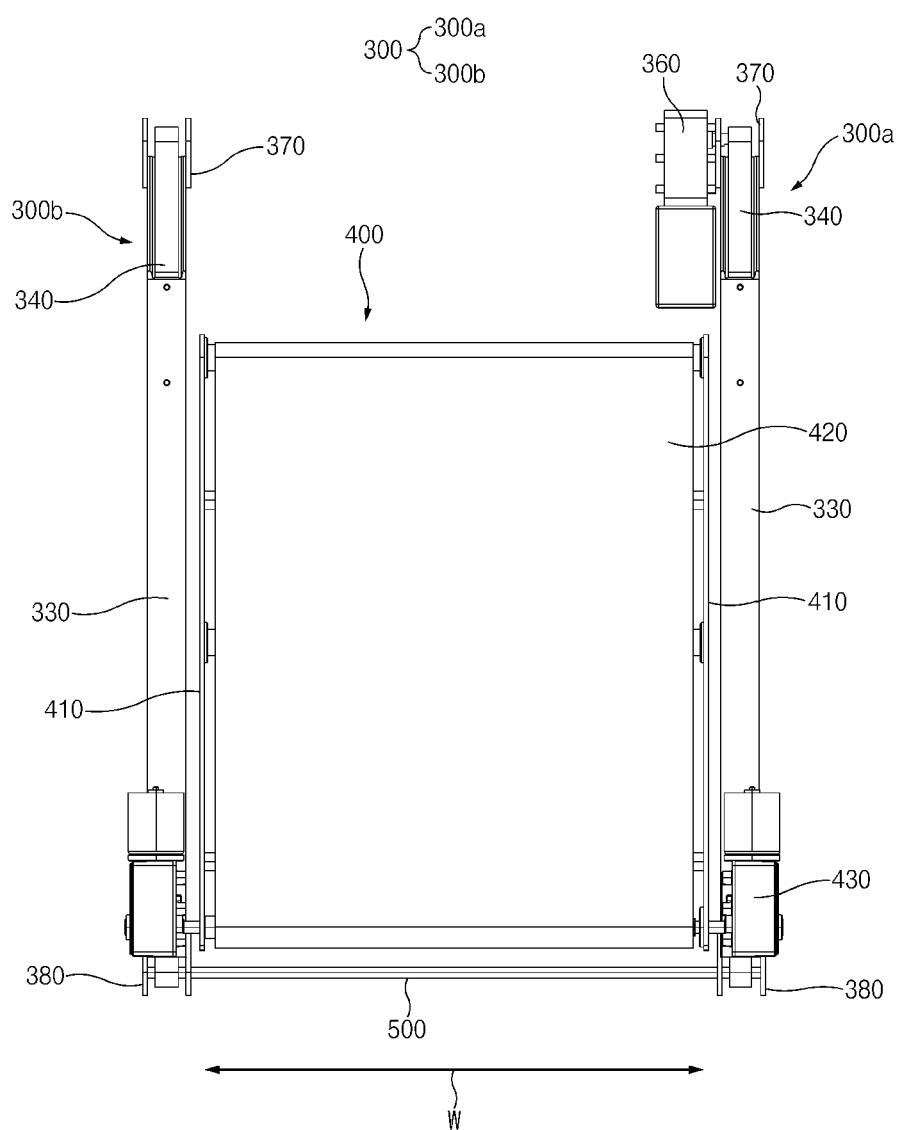
FIG. 4 is a front view illustrating the structure for coupling the movable module and the door module of the mobile object according to embodiments of the present disclosure.
Figure 5:
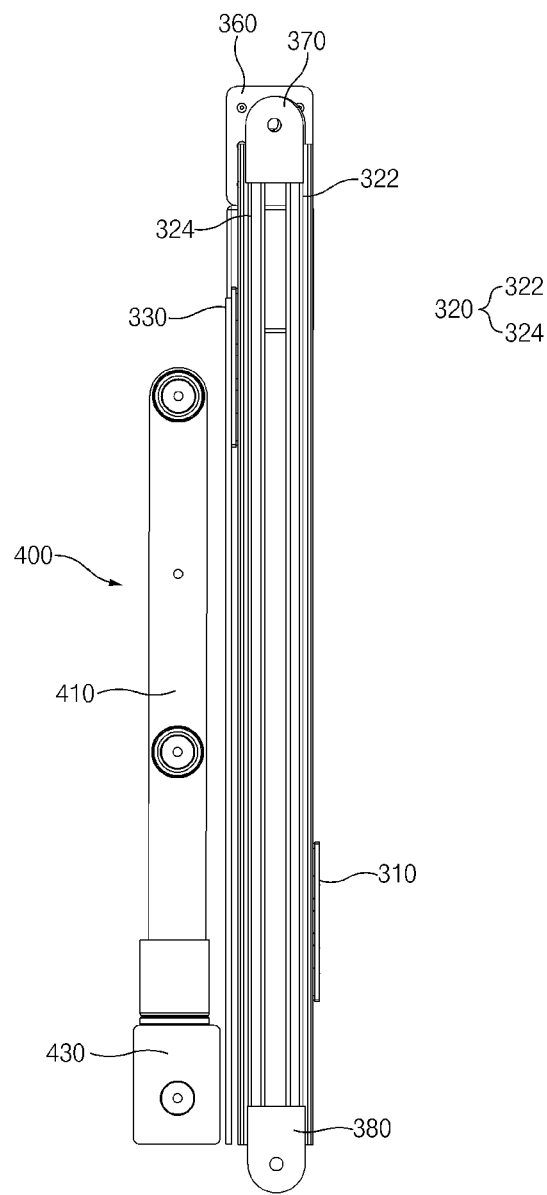
FIG. 5 is a side view illustrating the structure for coupling the movable module and the door module of the mobile object according to embodiments of the present disclosure.
Figure 6:
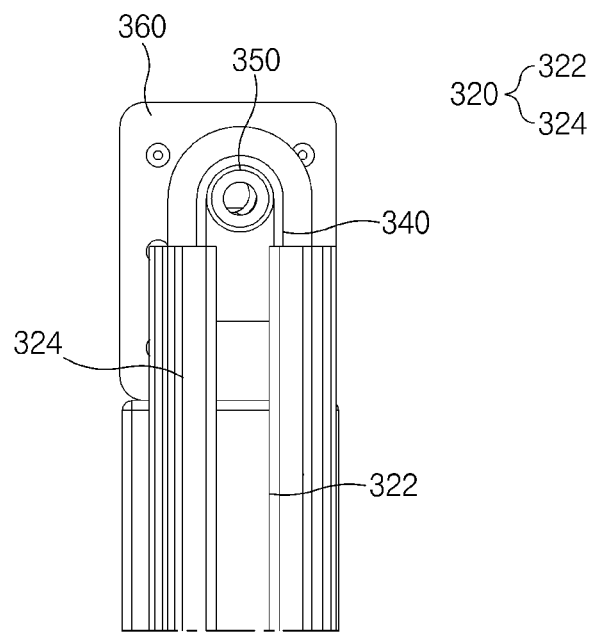
FIG. 6 is a vertical cross-sectional view illustrating an enlarged structure of an upper region of the movable module of the mobile object according to embodiments of the present disclosure.

FIG. 1 is a perspective view illustrating a structure of a mobile object according to embodiments of the present disclosure, and FIG. 2 is a perspective view illustrating a structure for coupling a frame part, movable modules, and a door module of the mobile object according to embodiments of the present disclosure. FIG. 3 is a rear view illustrating a structure for coupling the movable module and the door module of the mobile object according to embodiments of the present disclosure, and FIG. 4 is a front view illustrating the structure for coupling the movable module and the door module of the mobile object according to embodiments of the present disclosure. In addition, FIG. 5 is a side view illustrating the structure for coupling the movable module and the door module of the mobile object according to embodiments of the present disclosure, and FIG. 6 is a vertical cross-sectional view illustrating an enlarged structure of an upper region of the movable module of the mobile object according to embodiments of the present disclosure.

A mobile object 10 according to embodiments of the present disclosure may be configured to deliver an article A. As illustrated in FIGS. 1 to 6, the mobile object 10 may include a frame part 100 having an internal space. The frame part 100 may accommodate the article A therein. For example, a space in the frame part 100 may be divided into a plurality of internal spaces in a vertical direction. FIGS. 1 and 2 illustrate that the space in the frame part 100 is divided into two internal spaces in the vertical direction.

The mobile object 10 may include a wheel part 200 coupled to one side of the frame part 100 and including one or more wheels. For example, the wheel part 200 may be coupled to a lower side of the frame part 100.

In addition, the mobile object 10 may further include movable modules 300 coupled to the other side of the frame part 100 and provided to be movable relative to the frame part 100. As described below, a part of the movable module 300 may be fixedly coupled to the frame part 100. Another part of the movable module 300 may be movable in the vertical direction relative to the frame part 100. For example, the movable modules 300 may be coupled to a front side of the frame part 100.

Continuing to refer to FIGS. 1 to 6, the mobile object 10 may further include a door module 400 coupled to one side of the movable modules 300 and provided to be rotatable in a direction toward the internal space or a direction away from the internal space. The door module 400 may be configured to rotate to open or close the internal space with respect to the outside. For example, the door module 400 may be rotatable in the vertical direction.

According to embodiments of the present disclosure, the movable modules 300 may be movable in the vertical direction. The door module 400 may be rotatable relative to the movable modules 300. The door module 400 may be rotatable about its own axis. More particularly, according to embodiments of the present disclosure, the door module 400 may rotate relative to the movable modules 300 in a state in which one side of the door module 400 is fixed, such that the door module 400 may open or close the internal space with respect to the outside. Since the door module 400 may rotate about its own axis, the door module 400 may convey the article A, accommodated in the mobile object 10, to the outside as described below. Hereinafter, a detailed structure of the mobile object 10 will be described.

As illustrated in FIGS. 3 to 6, the movable module 300 may include a first coupling member 310 fixedly coupled to the frame part 100, a rail part 320 slidably coupled to the first coupling member 310, a second coupling member 330 slidably coupled to the rail part 320, and a movable belt member 340 configured to surround the rail part 320 and having one side coupled to the first coupling member 310 and the other side coupled to the second coupling member 330. More particularly, one side and the other side of the movable belt member 340 may be respectively and fixedly coupled to the first coupling member 310 and the second coupling member 330. A vertical cross-section of the movable belt member 340 may have a closed curve shape.

Continuing to refer to FIGS. 3 to 6, the rail part 320 may include a first rail member 322 slidably coupled to the first coupling member 310, and a second rail member 324 slidably coupled to the second coupling member 330. In this case, the first rail member 322 may be disposed at a front side of the frame part 100, and the second rail member 324 may be disposed at a front side of the first rail member 322 and spaced apart from the first rail member 322. Meanwhile, the first rail member 322 and the second rail member 324 may each extend in the vertical direction. Therefore, the first rail member 322 and the second rail member 324 may each have a vertical cross-section with a straight shape. The first rail member 322 and the second rail member 324 may serve to guide the motion of the movable belt member 340 when the movable belt member 340 rotates.

In addition, as illustrated in FIG. 6, the movable module 300 may further include a first pulley 350 disposed between the first rail member 322 and the second rail member 324 in a direction in which the movable belt member 340 extends and a first power supply member 360 configured to provide rotational power for rotating the first pulley 350. For example, the first power supply member 360 may be a motor including a rotary shaft. The first pulley 350 may be coupled to the rotary shaft of the first power supply member 360. A part of the movable belt member 340 may be in close contact with an outer surface of the first pulley 350. Therefore, when the first pulley 350 rotates, the movable belt member 340 may also rotate together with the first pulley 350.

In this case, as illustrated in FIGS. 5 and 6, according to an embodiment of the present disclosure, the first pulley 350 and the first power supply member 360 may be disposed in an upper region of the first rail member 322 and the second rail member 324. However, unlike the configuration illustrated in the drawings, according to another embodiment of the present disclosure, the first pulley 350 and the first power supply member 360 may be disposed in a lower region of the first rail member 322 and the second rail member 324.

Continuing to refer to FIGS. 3 to 5, the mobile object according to embodiments of the present disclosure may further include protection members each disposed between the first rail member 322 and the second rail member 324 in the direction in which the movable belt member 340 extends. The protection members may be configured to protect the movable belt member 340 exposed to the outside. In more detail, the protection members may include an upper protection member 370 disposed in the upper region of the first rail member 322 and the second rail member 324, and a lower protection member 380 disposed in the lower region of the first rail member 322 and the second rail member 324. The upper protection member 370 and the lower protection member 380 each have a plate shape extending in a forward/rearward direction to connect the first rail member 322 and the second rail member 324.

Meanwhile, the movable modules 300 may include a first movable module 300a and a second movable module 300b spaced apart from each other in a width direction W of the mobile object 10. In this case, the mobile object 10 according to embodiments of the present disclosure may further include a power transmission shaft 500 having one side connected to the movable belt member 340 provided in the first movable module 300a, and the other side connected to the movable belt member 340 provided in the second movable module 300b. Referring to FIGS. 3 and 4, the first power supply member 360 may be provided only in the first movable module 300a. According to embodiments of the present disclosure, a rotational force generated by the first power supply member 360 may be transmitted to the movable belt member 340 of the second movable module 300b through the movable belt member 340 of the first movable module 300a and the power transmission shaft 500. Therefore, the rotation of the movable belt member 340 of the first movable module 300a and the rotation of the movable belt member 340 of the second movable module 300b may be synchronized.

Meanwhile, the door module 400 of the mobile object 10 according to embodiments of the present disclosure may include two door frames 410 spaced apart from each other in the width direction W, a first shaft (not illustrated) disposed between the two door frames 410, and a door belt member 420 disposed to be in close contact with and surround an outer portion of the first shaft and configured to be rotated in the vertical direction between the two door frames 410 by the rotation of the first shaft. A vertical cross-section of the door belt member 420 may have a closed curve shape.

In addition, the door module 400 may further include a second shaft (not illustrated) disposed between the two door frames 410. In this case, the door frames 410 may be coupled to the second shaft so as to be rotatable about the second shaft.

The first shaft and the second shaft may receive rotational power from motors separately provided. The motors, which provide rotational power to the first and second shafts, respectively, may be accommodated in a second power supply member 430.

As described above, i) the door module 400 according to embodiments of the present disclosure may rotate relative to the movable module 300, and ii) the door module 400 may rotate about its own axis. In more detail, according to embodiments of the present disclosure, the operation i) may be implemented as the door frames 410 rotate about the second shaft, and the operation ii) may be implemented as the door belt member 420 is rotated by the rotation of the first shaft. The operation i) may be performed to open or close the internal space of the frame part 100 with respect to the outside, and the operation ii) may be performed to withdraw the article A to the outside in the state in which the internal space of the frame part 100 is opened to the outside.

Meanwhile, according to embodiments of the present disclosure, the first shaft and the second shaft may be disposed on the same axis. In this case, a volume occupied by the door module 400 may be reduced in comparison with a case in which the first shaft and the second shaft are disposed on different axes. For example, the first shaft may have a through-hole, and the second shaft may be inserted into the first shaft. As another example, the second shaft may have a through-hole, and the first shaft may be inserted into the second shaft.

In this case, the door module 400 may further include a bearing member (not illustrated) disposed between the first shaft and the second shaft and having one side being in contact with the first shaft and the other side being in contact with the second shaft. Therefore, the rotational motion of the first shaft and the rotational motion of the second shaft may be independently performed, such that the operation i) and the operation ii) may be independently implemented.

Meanwhile, the frame part 100 of the mobile object 10 according to embodiments of the present disclosure may further include a conveying shaft 110 rotatably provided, and a conveying belt member 120 configured to surround an outer portion of the conveying shaft 110 and to move by the rotation of the conveying shaft 110. Therefore, according to embodiments of the present disclosure, when the conveying belt member 120 is rotated by the rotation of the conveying shaft 110, the article A accommodated in the frame part 100 may move on the conveying belt member 120. A vertical cross-section of the conveying belt member 120 may have a closed curve shape.

As described above, the door module 400 according to embodiments of the present disclosure may move in the vertical direction. In more detail, when the movable belt members 340 rotate by S in the state in which the first coupling members 310 are fixed to the frame part 100, the first rail members 322 coupled to the first coupling members 310 move in the vertical direction by S relative to the frame part 100, and the door module 400 connected to the second coupling members 330 coupled to the movable belt members 340 may also move in the vertical direction by S. As a result, the door module 400 moves in the vertical direction by 2S relative to the frame part 100.

FIGS. 7 to 10 are views illustrating states in which the mobile object according to embodiments of the present disclosure operates.

Figure 7:
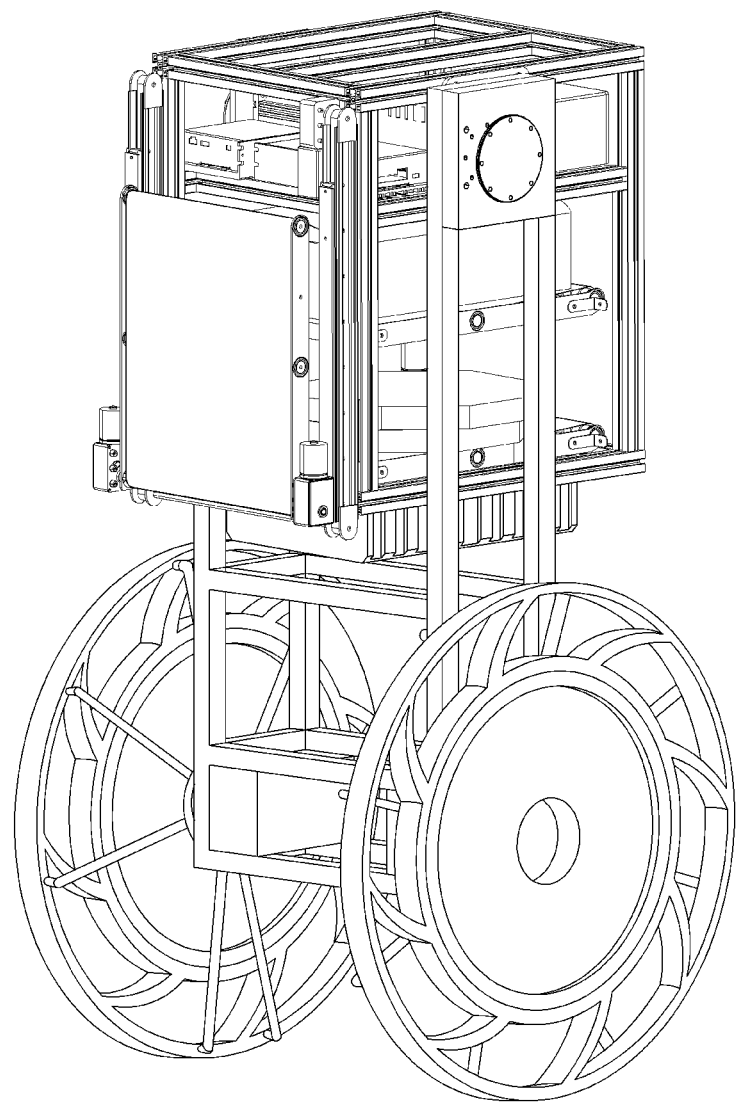
FIGS. 7 to 10 are views illustrating states in which the mobile object according to embodiments of the present disclosure operates.

According to embodiments of the present disclosure, the article A is delivered as the mobile object 10 moves in the state in which the article A is accommodated in the frame part 100 (see FIG. 7). In this case, the rotation of the second shaft is controlled so that the door module 400 closes the internal space of the frame part 100.

Figure 8:
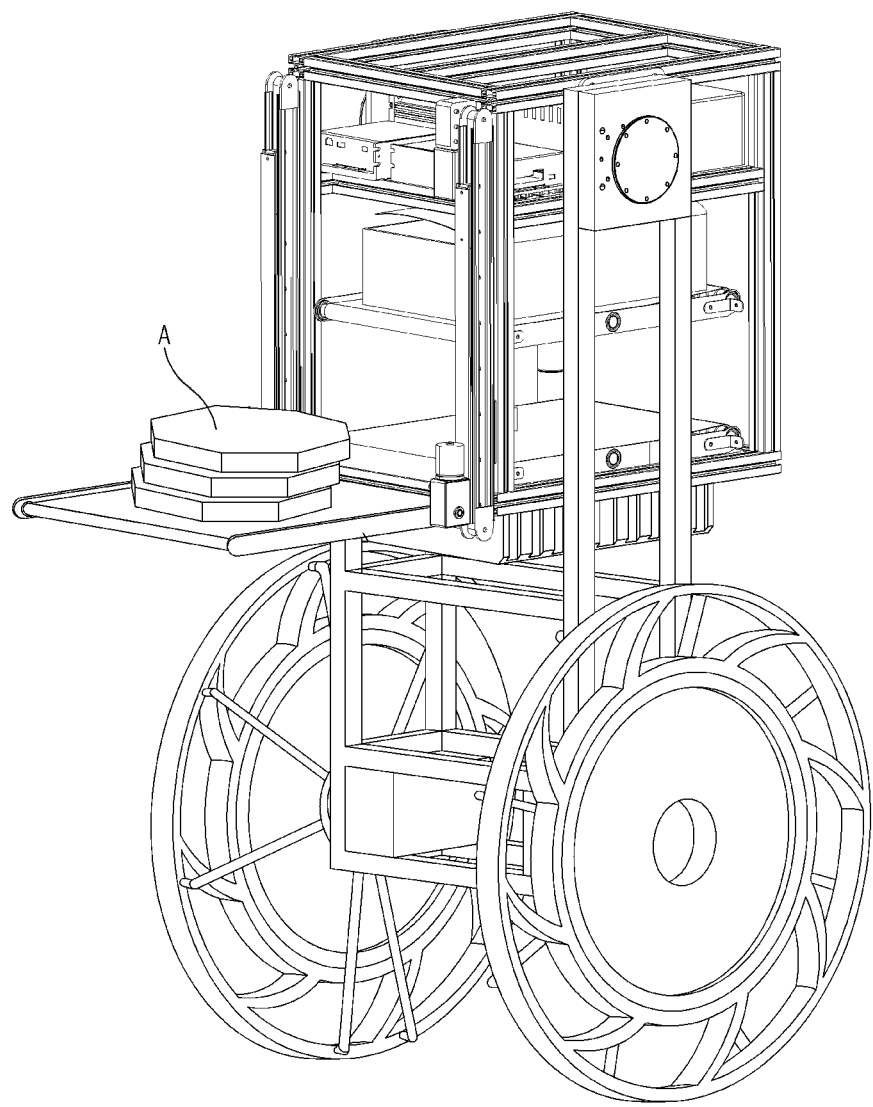

When the mobile object 10 reaches the destination, the door module 400 rotates about the second shaft, and the internal space of the frame part 100 is opened (see FIG. 8). In this case, the conveying belt member 120 provided in the frame part 100 rotates, and the article A accommodated in the frame part 100 is conveyed to the upper surface of the door module 400.

Figure 9:
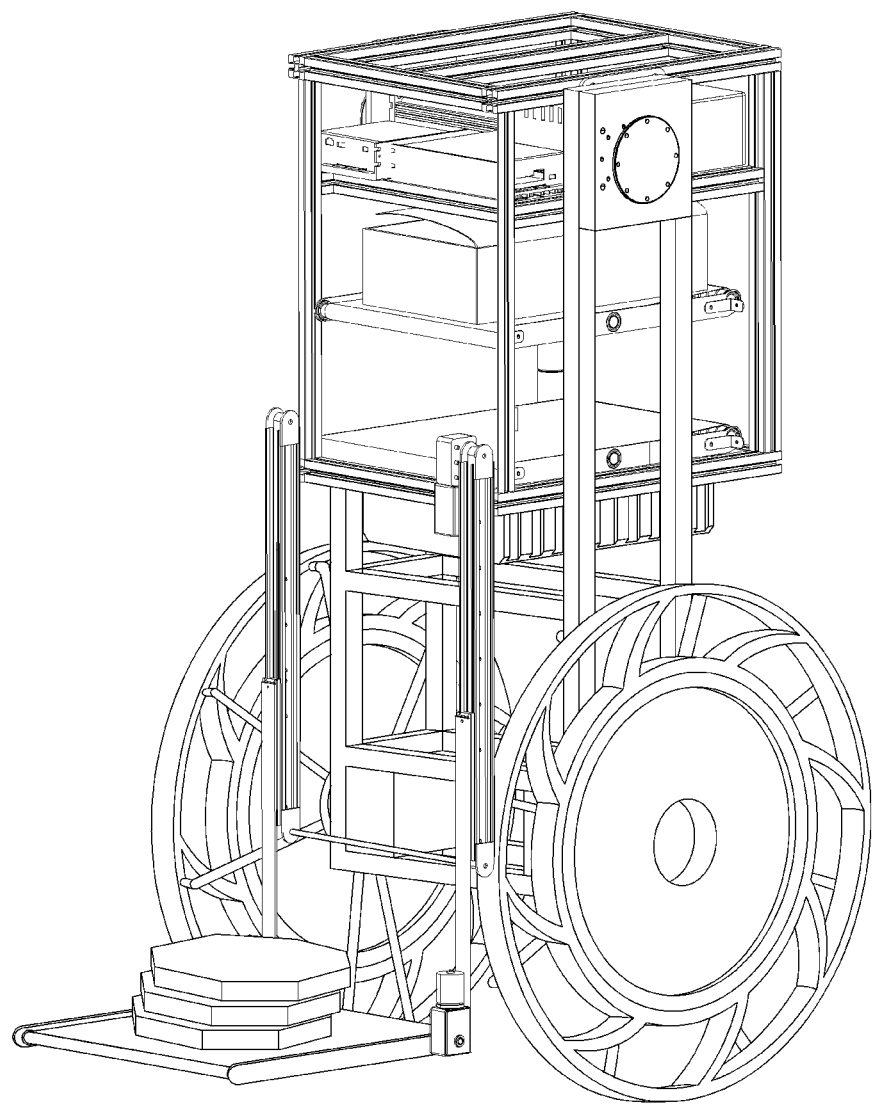
Figure 10:
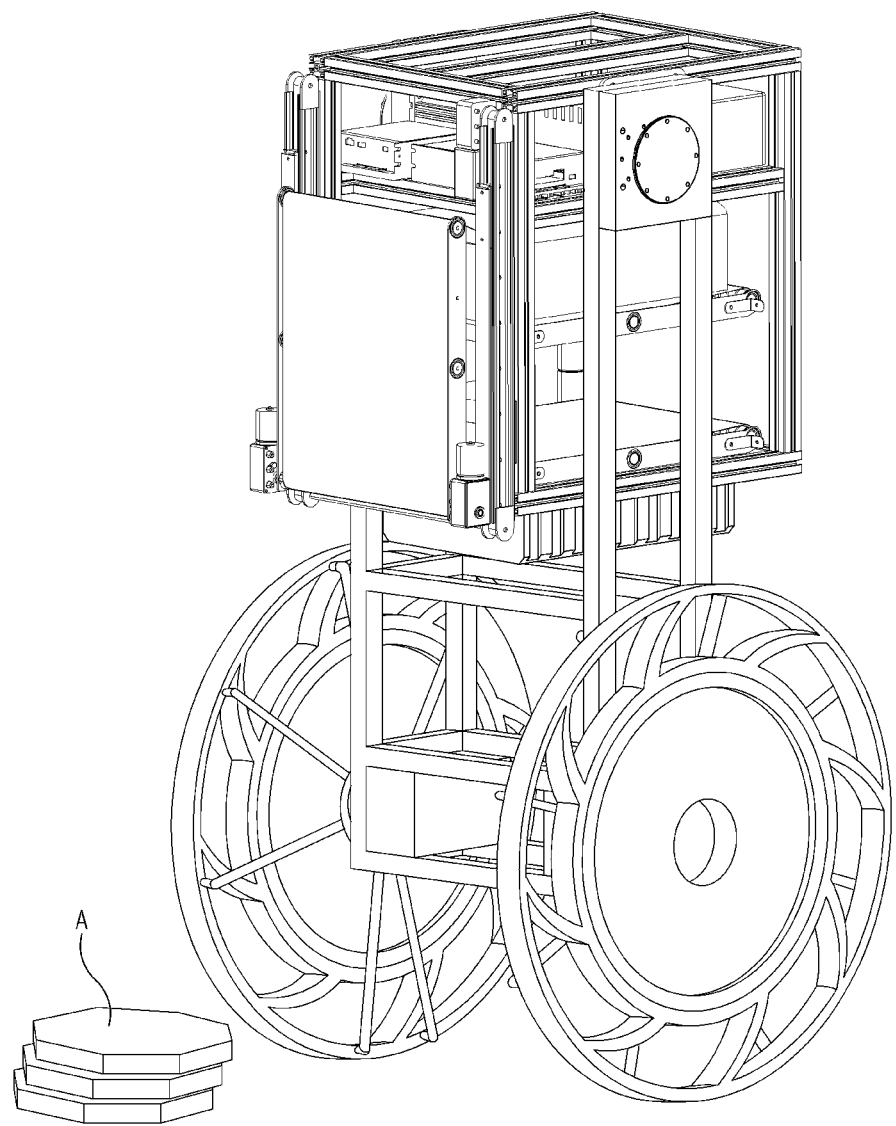

Thereafter, the first power supply member 360 provided in the movable module 300 rotates the movable belt members 340, and the door module 400 moves downward (see FIG. 9).

Finally, the first power supply member 360 provided in the movable module 300 rotates the movable belt members 340 to move the door module 400 upward, and the door module 400 rotates about the second shaft, such that the door module 400 returns to an original position (see FIG. 1).

The present disclosure has been described with reference to the exemplary embodiments and the drawings, but the present disclosure is not limited thereto. The present disclosure may be carried out in various forms by those skilled in the art to which the present disclosure pertains within the technical spirit of the present disclosure and within the scope equivalent to the appended claims.

What is claimed is:

1. A mobile object comprising:
   a frame part having an internal space;
   a wheel part coupled to a first side of the frame part and comprising a wheel;
   movable modules coupled to a second side of the frame part and configured to be movable in a vertical direction relative to the frame part; and
   a door module coupled to a first side of the movable modules, the door module being rotatable relative to the movable modules in a direction toward the internal space or a direction away from the internal space;
   wherein each of the movable modules comprises:
      a first coupling member fixedly coupled to the frame part;
      a rail part slidably coupled to the first coupling member;
      a second coupling member slidably coupled to the rail part; and
      a movable belt member surrounding the rail part and having a first side coupled to the first coupling member and a second side coupled to the second coupling member.

2. The mobile object of claim 1, wherein the first side and the second side of the movable belt member are fixedly coupled to the first coupling member and the second coupling member, respectively.

3. The mobile object of claim 1, wherein the rail part comprises:
   a first rail member disposed at a front side of the frame part and slidably coupled to the first coupling member; and
   a second rail member disposed at a front side of the first rail member and slidably coupled to the second coupling member.

4. The mobile object of claim 3, wherein each of the movable modules further comprises:
   a first pulley disposed between the first rail member and the second rail member in a direction in which the movable belt member extends; and
   a first power supply member configured to provide power for rotating the first pulley.

5. The mobile object of claim 4, wherein the first pulley and the first power supply member are disposed in an upper region of the first rail member and the second rail member.

6. The mobile object of claim 3, wherein the first rail member and the second rail member each extend in the vertical direction.

7. The mobile object of claim 1, wherein the movable modules comprise a first movable module and a second movable module spaced apart from each other in a width direction, each having the movable belt member provided therein.

8. The mobile object of claim 7, wherein the mobile object further comprises a power transmission shaft having a first side connected to the movable belt member provided in the first movable module, and a second side connected to the movable belt member provided in the second movable module.

9. The mobile object of claim 1, wherein the frame part further comprises:
   a conveying shaft rotatably provided; and
   a conveying belt member configured to surround the conveying shaft and be rotated by a rotation of the conveying shaft.

10. The mobile object of claim 9, wherein the first side and the second side of the movable belt member are fixedly coupled to the first coupling member and the second coupling member, respectively.

11. The mobile object of claim 9, wherein the rail part comprises:
    a first rail member disposed at a front side of the frame part and slidably coupled to the first coupling member; and
    a second rail member disposed at a front side of the first rail member and slidably coupled to the second coupling member.

12. A mobile object comprising:
    a frame part having an internal space;
    a wheel part coupled to a first side of the frame part and comprising a wheel;
    movable modules coupled to a second side of the frame part and configured to be movable relative to the frame part and movable in a vertical direction, wherein the movable module comprises:
       a first coupling member fixedly coupled to the frame part;
       a rail part slidably coupled to the first coupling member;
       a second coupling member slidably coupled to the rail part; and
       a movable belt member surrounding the rail part and having a first side coupled to the first coupling member and a second side coupled to the second coupling member; and
    a door module coupled to a first side of the movable modules and configured to be rotatable in a direction toward the internal space or a direction away from the internal space, rotatable relative to the movable modules, and rotatable about its own axis, wherein the door module comprises:
       two door frames spaced apart from each other in a width direction;
       a first shaft disposed between the two door frames; and
       a door belt member surrounding an outer portion of the first shaft and configured to be rotatable between the two door frames by a rotation of the first shaft.

13. The mobile object of claim 12, wherein the door module further comprises a second shaft disposed between the two door frames, and the door frames are coupled to the second shaft and configured to be rotatable about the second shaft.

14. The mobile object of claim 13, wherein the first shaft and the second shaft are disposed on the same axis.

15. The mobile object of claim 13, wherein the door module further comprises a bearing member disposed between the first shaft and the second shaft and having a first side in contact with the first shaft and a second side in contact with the second shaft.

16. A method of operating a mobile object that includes a plurality of movable modules located within an internal space of the mobile object, the method comprising:
    moving the mobile object to a delivery location;
    moving a first movable module of the plurality of movable modules to a lower portion of the internal space;

rotating a door module of the mobile object away from the internal space about a door module axis adjacent the lower portion of the internal space;
moving an article in the first movable module onto a surface of the door module; and
lowering the door module toward a floor surface;
wherein each of the movable modules comprises:
- a first coupling member fixedly coupled to a frame part of the mobile object;
- a rail part slidably coupled to the first coupling member;
- a second coupling member slidably coupled to the rail part; and
- a movable belt member surrounding the rail part and having a first side coupled to the first coupling member and a second side coupled to the second coupling member.

17. The method of claim 16, further comprising moving the article from the surface of the door module to the floor surface.

18. The method of claim 17, further comprising:
raising the door module toward the internal space;
rotating the door module toward the internal space about the door module axis; and
moving the mobile object away from the delivery location.

19. The method of claim 16, wherein the article in the first movable module is moved onto the surface of the door module using a conveyor belt.

20. The method of claim 16, wherein the mobile object comprises:
- a frame part defining the internal space;
- a wheel part coupled to a first side of the frame part and comprising a wheel, the mobile object being moved to the delivery location using the wheel;
- the movable modules, which are coupled to a second side of the frame part and configured to be movable in a vertical direction relative to the frame part; and
- the door module, which is coupled to a first side of the movable modules.

* * * * *